(12) United States Patent
Chan et al.

(10) Patent No.: US 10,451,469 B2
(45) Date of Patent: Oct. 22, 2019

(54) FUEL LEVEL SENSOR HAVING DUAL FLUORESCENT PLASTIC OPTICAL FIBERS

(71) Applicant: The Boeing Company, Chicago, IL (US)

(72) Inventors: Eric Y. Chan, Mercer Island, WA (US); Dennis G. Koshinz, Bellevue, WA (US); Tuong K. Truong, Bellevue, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 16/203,980

(22) Filed: Nov. 29, 2018

(65) Prior Publication Data
US 2019/0107431 A1 Apr. 11, 2019

Related U.S. Application Data

(62) Division of application No. 15/428,626, filed on Feb. 9, 2017, now Pat. No. 10,175,087.

(51) Int. Cl.
*G01F 23/292* (2006.01)
*F21V 8/00* (2006.01)
(Continued)

(52) U.S. Cl.
CPC ....... *G01F 23/2927* (2013.01); *B64D 37/005* (2013.01); *B64D 37/02* (2013.01);
(Continued)

(58) Field of Classification Search
CPC ... B65H 57/16; G01F 23/292; G01F 23/2922; G01N 2021/8528; G01N 21/59; G01N 21/8507; H02G 7/12
See application file for complete search history.

(56) References Cited

U.S. PATENT DOCUMENTS 2,887,524 A * 5/1959 Fulps ................. H02G 7/12
174/146
D204,456 S * 4/1966 Mason ..................... 174/146
(Continued)

FOREIGN PATENT DOCUMENTS

CA 1332205 10/1994
DE 3940455 A1 9/1990
(Continued)

OTHER PUBLICATIONS

Miller et al., "Feasibility Demonstration of Fiber Optic Digital Status Monitoring Devices", Boeing Aerospace Company, Sep. 22, 1978. (Year: 1978).*

(Continued)

*Primary Examiner* — David A Rogers
(74) *Attorney, Agent, or Firm* — Ostrager Chong Flaherty & Broitman P.C.

(57) ABSTRACT

An airplane fuel level optical sensor using one side-emitting plastic optical fiber (SPOF) and two fluorescent plastic optical fibers (FPOFs) to detect the airplane fuel level without using any electrically conductive component or element placed inside the fuel tank. This dual-FPOF sensor is capable of achieving high resolution and high accuracy with a one-time calibration in the actual airplane's fuel tank environment. One embodiment of the dual-FPOF sensor uses one SPOF and two FPOFs to detect fuel level change based on the optical signal output from the two FPOFs. The sensor design uses large-diameter (core and cladding), lightweight, low-cost and high-durability plastic optical fiber, which is very desirable for airplane installation.

20 Claims, 11 Drawing Sheets

(51) Int. Cl.
  *B64D 37/00* (2006.01)
  *B65H 57/16* (2006.01)
  *H02G 7/12* (2006.01)
  *B64D 37/02* (2006.01)

(52) U.S. Cl.
  CPC .......... *B65H 57/16* (2013.01); *G01F 23/292* (2013.01); *G02B 6/001* (2013.01); *G02B 6/0003* (2013.01); *H02G 7/12* (2013.01)

(56) References Cited

U.S. PATENT DOCUMENTS

| | | | |
|---|---|---|---|
| 3,268,655 A * | 8/1966 | Haigh | H02G 7/12 174/146 |
| D219,363 S * | 12/1970 | Mackness | 174/146 |
| 4,287,427 A * | 9/1981 | Scifres | G01N 21/431 250/577 |
| 4,342,919 A * | 8/1982 | Brogardh | G01D 5/268 250/577 |
| 4,644,145 A | 2/1987 | Guendner | |
| 4,768,859 A * | 9/1988 | Kasori | C03C 3/118 385/144 |
| 4,795,856 A * | 1/1989 | Farmer | F16L 3/223 174/40 R |
| 4,870,292 A | 9/1989 | Alpert et al. | |
| 4,928,006 A | 5/1990 | Kershaw | |
| D308,933 S * | 7/1990 | Hube | D8/356 |
| 4,942,306 A | 7/1990 | Colbourne | |
| 4,994,682 A | 2/1991 | Woodside | |
| 5,164,608 A * | 11/1992 | Vali | G01F 23/292 250/227.23 |
| 5,320,312 A * | 6/1994 | Hoenninger | F16L 3/227 211/107 |
| D395,815 S * | 7/1998 | Walters | D8/354 |
| 6,066,844 A * | 5/2000 | Ford | G01J 1/42 250/201.1 |
| 6,172,377 B1 | 1/2001 | Weiss | |
| 6,274,880 B1 | 8/2001 | Walker | |
| 6,333,512 B1 | 12/2001 | Wirthlin | |
| 6,429,447 B1 | 8/2002 | Nowak et al. | |
| 6,452,153 B1 * | 9/2002 | Lauxtermann | H01L 27/14643 250/208.1 |
| 6,726,371 B2 * | 4/2004 | Nishita | G02B 6/3855 385/62 |
| 6,788,873 B2 * | 9/2004 | Fritz | G02B 6/4248 385/138 |
| 6,795,598 B1 | 9/2004 | Devenyi | |
| 6,801,678 B2 * | 10/2004 | Murshid | G01F 23/292 250/227.14 |
| 7,049,622 B1 | 5/2006 | Weiss | |
| 7,161,165 B2 | 1/2007 | Wirthlin | |
| 7,329,857 B1 * | 2/2008 | Weiss | G01F 23/2925 250/227.11 |
| 7,660,494 B2 | 2/2010 | Anderson | |
| 7,710,567 B1 | 5/2010 | Mentzer et al. | |
| 7,856,888 B2 * | 12/2010 | Ferguson | G01B 11/18 385/13 |
| 8,477,298 B2 * | 7/2013 | Sutherland | G02B 6/4214 356/138 |
| D691,876 S * | 10/2013 | Ganski | D8/356 |
| 8,800,940 B2 * | 8/2014 | Eshima | H02G 3/32 248/62 |
| 8,905,649 B2 * | 12/2014 | Enomoto | G02B 6/3858 385/65 |
| D763,063 S * | 8/2016 | Welch | D8/356 |
| 9,645,004 B2 * | 5/2017 | Truong | B64D 37/005 |
| 9,711,956 B1 * | 7/2017 | Welch | H02G 1/085 |
| 9,837,802 B1 * | 12/2017 | Welch | H02G 1/08 |
| 9,856,998 B2 * | 1/2018 | Cripps, II | F16L 3/222 |
| D817,153 S * | 5/2018 | Harogolige Padmanabha | D8/356 |
| 2004/0036043 A1 * | 2/2004 | Murshid | G01F 23/292 250/573 |
| 2004/0119037 A1 * | 6/2004 | Mentzer | G01F 23/292 250/573 |
| 2005/0109923 A1 * | 5/2005 | Hickey | G02B 6/35 250/227.21 |
| 2005/0152642 A1 * | 7/2005 | Xu | G02B 6/29367 385/24 |
| 2005/0236591 A1 | 10/2005 | Wirthlin | |
| 2006/0087723 A1 * | 4/2006 | Takeyama | H01S 3/06758 359/337 |
| 2006/0273238 A1 * | 12/2006 | Sugiyama | G01B 11/00 250/208.1 |
| 2006/0285813 A1 * | 12/2006 | Ferguson | G01B 11/16 385/138 |
| 2007/0145309 A1 | 6/2007 | Zhang | |
| 2008/0180661 A1 * | 7/2008 | Brown | G01J 3/02 356/301 |
| 2009/0076744 A1 | 3/2009 | Anderson | |
| 2009/0084995 A1 | 4/2009 | Cierullies et al. | |
| 2010/0328651 A1 * | 12/2010 | Gaspari | G01K 11/3206 356/73.1 |
| 2012/0186845 A1 * | 7/2012 | Eshima | H02G 3/03 174/15.6 |
| 2012/0307252 A1 * | 12/2012 | Moores | G01C 19/721 356/460 |
| 2014/0014777 A1 | 1/2014 | Kreitmair-Steck et al. | |
| 2015/0086206 A1 * | 3/2015 | Goldner | G01P 15/093 398/84 |
| 2015/0141854 A1 * | 5/2015 | Eberle | A61B 5/02154 600/488 |
| 2016/0138958 A1 * | 5/2016 | Truong | B64D 37/005 |
| 2016/0238428 A1 * | 8/2016 | Choi | G01F 23/292 |

FOREIGN PATENT DOCUMENTS

| | | | |
|---|---|---|---|
| GB | 2293007 A | | 3/1996 |
| JP | 61014506 A * | 1/1986 | ............ G01B 11/00 |
| JP | 63061952 A * | 3/1988 | |
| WO | 2010051806 A1 | | 5/2010 |

OTHER PUBLICATIONS

Abstract, Zhao et al., "Novel light-leaking optical fiber liquid-level sensor for aircraft fuel gauging", Opt. Eng., vol. 52, No. 1, 014402 (Jan. 4, 2013); http://dx.doi.org/10.1117/1.OE.52.1.014402.
English Abstract of DE3940455, Sep. 27, 1990, Mercedes Benz.
Wikipedia, "Optical Fiber", Feb. 8, 2017.
Wikipedia, "Dual Modular Redundancy", Apr. 29, 2015.
Extended European Search Report dated Jun. 28, 2018 in European Patent Application No. 17208836.1 (European counterpart to the parent application of the instant divisional application).
Notices of References Cited by the examiner during prosecution of U.S. Appl. No. 15/428,626 (parent of instant divisional patent application).

* cited by examiner

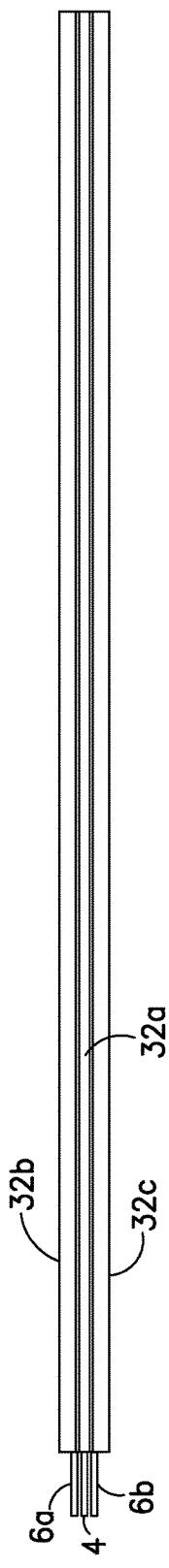
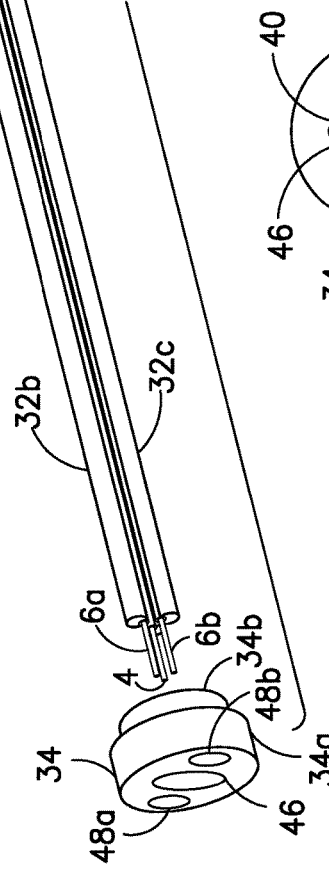
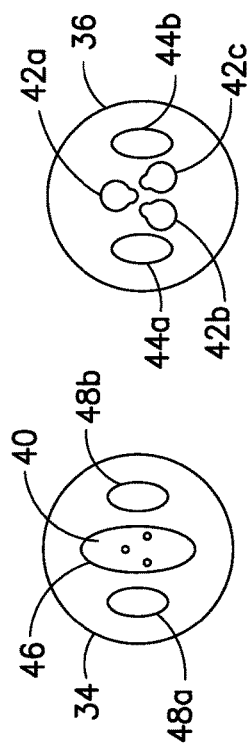
FIG. 11
FIG. 12
FIG. 13
FIG. 14

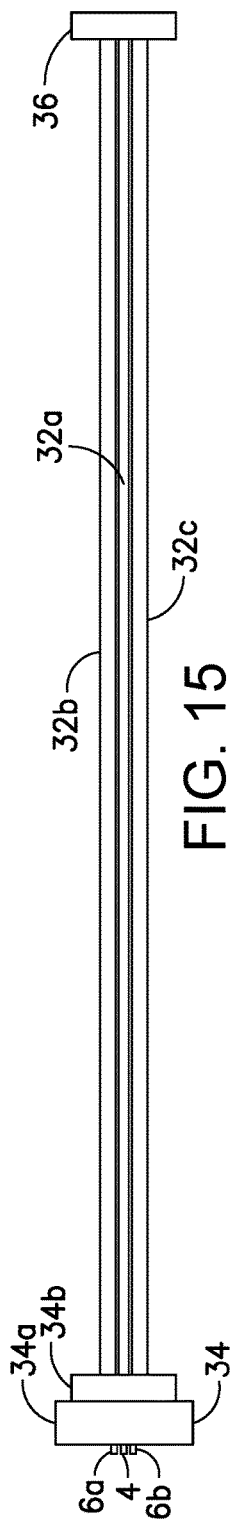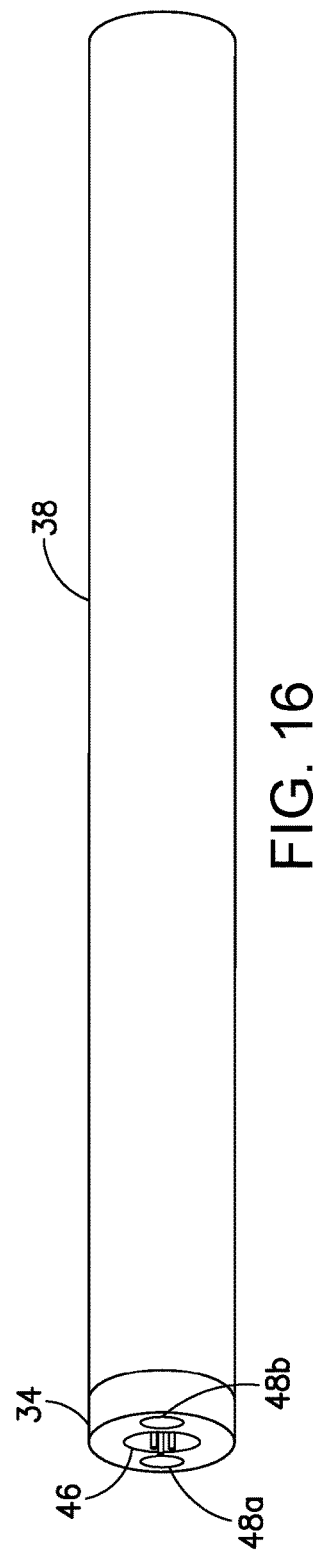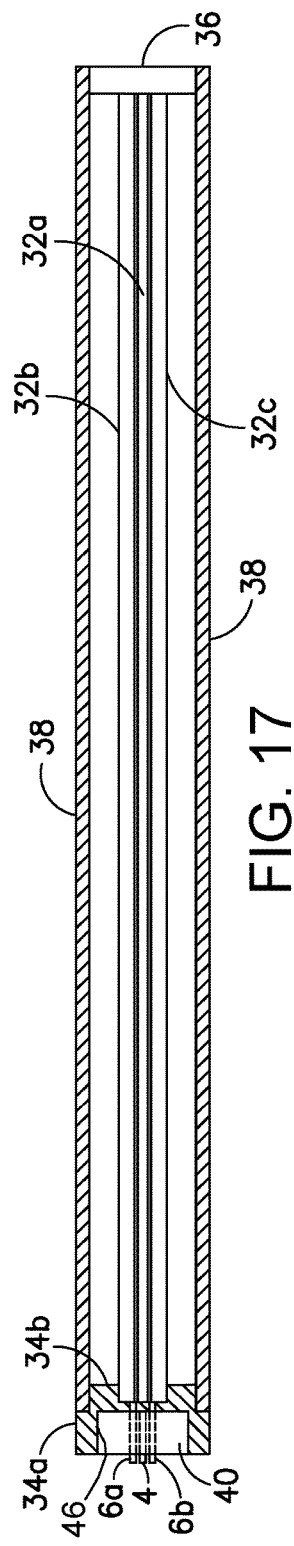

FUEL LEVEL SENSOR HAVING DUAL FLUORESCENT PLASTIC OPTICAL FIBERS

RELATED PATENT APPLICATION

This application is a divisional of and claims priority from U.S. patent application Ser. No. 15/428,626 filed on Feb. 9, 2017, which issued as U.S. Pat. No. 10,175,087 on Jan. 8, 2019.

BACKGROUND

This disclosure generally relates to systems and methods for measuring a level of liquid in a reservoir, such as a storage tank or other container. More particularly, this disclosure relates to systems and methods for liquid level measurement using an optical sensor.

A need to continuously measure the level of a liquid exists in many commercial and military applications. For example, liquid-level sensors are commonly used in the fuel tanks of airplane, automobiles, and trucks. Liquid-level sensors are also used to monitor liquid levels within storage tanks used for fuel dispensing, wastewater treatment, chemical storage, food processing, etc.

Many transducers for measuring liquid level employ electricity. The electrical output of such transducers changes in response to a change in the liquid level being measured, and is typically in the form of a change in resistance, capacitance, current flow, magnetic field, frequency, and so on. These types of transducers may include variable capacitors or resistors, optical components, Hall Effect sensors, strain gauges, ultrasonic devices, and so on.

Currently most fuel sensors on airplane use electricity. For example, existing electrical capacitance sensors require metallic capacitance plates and metal wiring to be placed inside the tank, which in turn requires complex installations and protection measures to preclude a safety issue under certain electrical fault conditions. This electrical wiring requires careful shielding, bonding; and grounding to minimize stray capacitance and further requires periodic maintenance to ensure electrical contact integrity. Secondly, capacitance probe measurement requires other sensor inputs, such as temperature and density sensor inputs, to supplement the capacitance measurement to accomplish the fuel level sensing.

There is room for improvements in systems and methods that can detect the level of liquid in a fuel tank without introducing electrical current into the fuel tank.

SUMMARY

Fluorescence is the emission of light by a substance that has absorbed light or other electromagnetic radiation. As used herein, the term "fluorescent plastic optical fiber" means a plastic optical fiber that comprises a core surrounded by cladding, wherein the core is doped with special materials that will produce light (i.e., photons) having a first spectral bandwidth centered at a first wavelength when light having a second spectral bandwidth centered at a second wavelength different than the first wavelength is absorbed by that core. Typically the first wavelength is greater than the second wavelength. As used herein, the term "side-emitting plastic optical fiber" means a plastic optical fiber that emits light along the side of the plastic optical fiber. In accordance with alternative embodiments, fluorescent glass optical fibers can be used instead of fluorescent plastic optical fiber.

The subject matter disclosed herein is broadly directed to the design and implementation of an optical liquid level sensor using one side-emitting optical fiber and two fluorescent optical fibers to detect the liquid level without using any electrically conductive component or element placed inside the fuel tank. For the purpose of illustration, the following disclosure is directed to the design and implementation of an airplane fuel level optical sensor using one side-emitting plastic optical fiber (SPOF) and two fluorescent plastic optical fibers (FPOFs) to detect the airplane fuel level without using any electrically conductive component or element placed inside the fuel tank. This dual-FPOF sensor detects the fuel level without the need of using other supplemental sensor inputs, and it is capable of achieving high resolution and high accuracy with a one-time calibration in the actual airplane's fuel tank environment.

More specifically, the dual-FPOF sensor uses one SPOF and two FPOFs having different photo response efficiencies to detect fuel level change based on the optical power signals output from the dual FPOFs. There is no electrical current to pass through the fuel in the tank to cause any safety concern. The sensor design uses large-diameter (core and cladding), lightweight, low-cost and high-durability POF, which is very desirable for airplane installation.

One aspect of the subject matter disclosed in detail below is a system for measuring a level of liquid in a reservoir, comprising: a light source for outputting light; a side-emitting optical fiber having one end optically coupled to the light source; an optical detector for converting impinging light into an electrical signal representing an optical power of the impinging light; and a fluorescent optical fiber positioned parallel to and at a distance from the side-emitting optical fiber and having one end optically coupled to the optical detector. The side-emitting optical fiber and the fluorescent optical fiber may be made of plastic or glass.

In accordance with some embodiments, the system further comprises: a voltage-controlled variable optical attenuator (hereinafter "variable optical attenuator") that optically couples the fluorescent optical fiber to the optical detector; a computing system that is electrically coupled to the variable optical attenuator; a current-to-voltage converter electrically coupled to receive photo-current output by the optical detector and transmit a voltage to the computing system; and a fuel level indicator electrically coupled to the computing system, wherein the computing system is further configured to output a fuel level to the fuel level indicator, which fuel level is based in part on the voltage received from the current-to-voltage converter.

Another aspect of the subject matter disclosed in detail below is a system for measuring a level of liquid in a reservoir, comprising: a light source for outputting light; a side-emitting optical fiber having one end optically coupled to the light source; first and second optical detectors for converting impinging light into an electrical signal representing an optical power of the impinging light; a first fluorescent optical fiber positioned parallel to and at a distance from the side-emitting optical fiber and having one end optically coupled to the first optical detector; and a second fluorescent optical fiber positioned parallel to and at the distance from the side-emitting optical fiber and having one end optically coupled to the second optical detector, wherein the first and second fluorescent optical fibers have different photo response efficiencies. The side-emitting optical fiber and the fluorescent optical fibers may be made of plastic or glass.

In accordance with some embodiments, the system further comprises: a first variable optical attenuator that optically couples the first fluorescent optical fiber to the first optical detector; a second variable optical attenuator that optically couples the second fluorescent optical fiber to the second optical detector; a light source power controller for controlling the electrical current provided to the light source; and a computing system configured to send first control signals to the first and second variable optical attenuators, which first control signals set the levels of attenuation provided by the first and second variable optical attenuators, and further configured to send second control signals to the light source power controller, which second control signals set the level of electrical current provided to the light source. This system may further comprise: a first current-to-voltage converter coupled to receive photo-current output by the first optical detector and transmit a first voltage to the computing system; and a second current-to-voltage converter coupled to receive photo-current output by the second optical detector and transmit a second voltage to the computing system, wherein the computing system is further configured to calculate a ratio of the first and second voltages, and the first and second control signals are based in part on the ratio. In addition, this system may further comprise a fuel level indicator electrically coupled to the computing system, wherein the computing system is further configured to output a fuel level to the fuel level indicator, which fuel level is based in part on a third voltage received from the first current-to-voltage converter after sending of the first and second control signals.

A further aspect of the subject matter disclosed in detail below is an optical system comprising: first, second and third composite holding rods; first, second and third glass tubes respectively partially embedded in and partially protruding from the first, second and third composite holding rods; a side-emitting plastic optical fiber embedded in the first glass tube; a first fluorescent plastic optical fiber embedded in the second glass tube; a second fluorescent plastic optical fiber embedded in the third glass tube; and a supporting structure that supports the first, second and third composite holding rods such that light emitted by the side-emitting plastic optical fiber will be received by the first and second fluorescent plastic optical fibers.

In accordance with some embodiments, the supporting structure comprises: a composite outer tube having first and second ends; a first end cap affixed to the first end of the composite outer tube; and a second end cap affixed to the second end of the composite outer tube, wherein the first, second and third composite holding rods are disposed inside the composite outer tube. In addition, the optical system may further comprise an optical fiber holding cylinder having first, second and third openings, wherein the first end cap has an opening which is configured to receive the optical fiber holding cylinder, the side-emitting plastic optical fiber passes through the first opening in the optical fiber holding cylinder, the first fluorescent plastic optical fiber passes through the second opening in the optical fiber holding cylinder, and the second fluorescent plastic optical fiber passes through the third opening in the optical fiber holding cylinder. The second end cap has first, second and third openings which are configured to receive respective ends of the first, second and third composite holding rods.

Yet another aspect of the subject matter disclosed in detail below is a method for measuring a height of liquid in a reservoir, comprising: placing a side-emitting optical fiber and a first fluorescent optical fiber in the liquid contained in the reservoir having respective locations whereat the side-emitting optical fiber and the first fluorescent optical fiber are mutually parallel and separated by a distance, and the first fluorescent optical fiber has a first photo response efficiency; inputting light from a light source into one end of the side-emitting optical fiber; side-emitting at least some of the inputted light from the side-emitting optical fiber; absorbing at least some of the side-emitted light inside the first fluorescent optical fiber; producing light by fluorescence inside the first fluorescent optical fiber in response to absorption of side-emitted light; emitting light produced by fluorescence from one end of the first fluorescent optical fiber; converting at least some of the light emitted by the first fluorescent optical fiber into a first photo-current; converting the first photo-current into a first voltage; calculating the height of the liquid in the reservoir based in part on a magnitude of the first voltage; and visually indicating the height on a display.

In accordance with one embodiment of the method, the placing step further comprises placing a second fluorescent optical fiber in the liquid contained in the reservoir having a location whereat the side-emitting optical fiber and the second fluorescent optical fiber are mutually parallel and separated by the distance, and the second fluorescent optical fiber has a second photo response efficiency different than the first photo response efficiency, the method further comprising: absorbing at least some of the side-emitted light inside the second fluorescent optical fiber; producing light by fluorescence inside the second fluorescent optical fiber in response to absorption of side-emitted light; emitting light produced by fluorescence from one end of the second fluorescent optical fiber; converting at least some of the light emitted by the second fluorescent optical fiber into a second photo-current; converting the second photo-current into a second voltage; calculating a ratio of the first and second voltages; and comparing the calculated ratio to a predetermined constant, wherein the height is calculated if the calculated ratio and the predetermined constant are equal. In addition, the method may further comprise: attenuating the light emitted by the first and second fluorescent optical fibers if the calculated ratio and the predetermined constant are not equal; and changing the optical power of the light inputted into the one end of the side-emitting optical fiber if the calculated ratio and the predetermined constant are not equal.

Other aspects of optical sensors suitable for use in detecting the level of a liquid in a reservoir are disclosed and claimed below.

BRIEF DESCRIPTION OF THE DRAWINGS

The features, functions and advantages discussed in the preceding section can be achieved independently in various embodiments or may be combined in yet other embodiments. Various embodiments will be hereinafter described with reference to drawings for the purpose of illustrating the above-described and other aspects.

FIGS. 8 through 17 are diagrams showing a detailed hardware design of a POF assembly in accordance with one embodiment.

FIG. 8 is a diagram representing a perspective view of one SPOF and two FPOFs arranged in parallel with the center axes of the three POFs located at the vertices of an equilateral triangle, major portions of the three POFs being embedded in respective glass tubes.

FIG. 9 is a diagram representing an isometric view of respective ends of the glass tubes with embedded SPOF and FPOFs depicted in FIG. 8, these glass tubes being partly embedded in and partly protruding out of respective composite holding rods.

FIG. 10 is a diagram representing an end view of the composite holding rods (with partially embedded glass tubes) depicted in FIG. 9.

FIG. 11 is a diagram representing a side view of the composite holding rods (with partially embedded glass tubes) depicted in FIGS. 9 and 10.

FIG. 12 is a diagram representing an exploded isometric view of an end-cap assembly comprising three composite holding rods (with partially embedded glass tubes) with end caps at opposite ends thereof.

FIGS. 13 and 14 are diagrams representing plan views of the end caps depicted in FIG. 12.

FIG. 15 is a diagram representing a side view of the End-cap assembly comprising three composite holding rods (with partially embedded glass tubes) with end caps at opposite ends thereof.

FIG. 16 is a diagram representing an isometric view of a POF assembly comprising the end-cap assembly depicted in FIG. 15 and a composite outer tube.

FIG. 17 is a diagram representing a partially sectioned view of the POF assembly depicted in FIG. 16.

Reference will hereinafter be made to the drawings in which similar elements in different drawings bear the same reference numerals.

DETAILED DESCRIPTION

Various embodiments of systems and methods for optical measurement of a level of liquid in a reservoir will now be described in detail for the purpose of illustration. At least some of the details disclosed below relate to optional features or aspects, which in some applications may be omitted without departing from the scope of the claims appended hereto.

In particular, illustrative embodiments of an optical fuel level sensor for airplanes are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
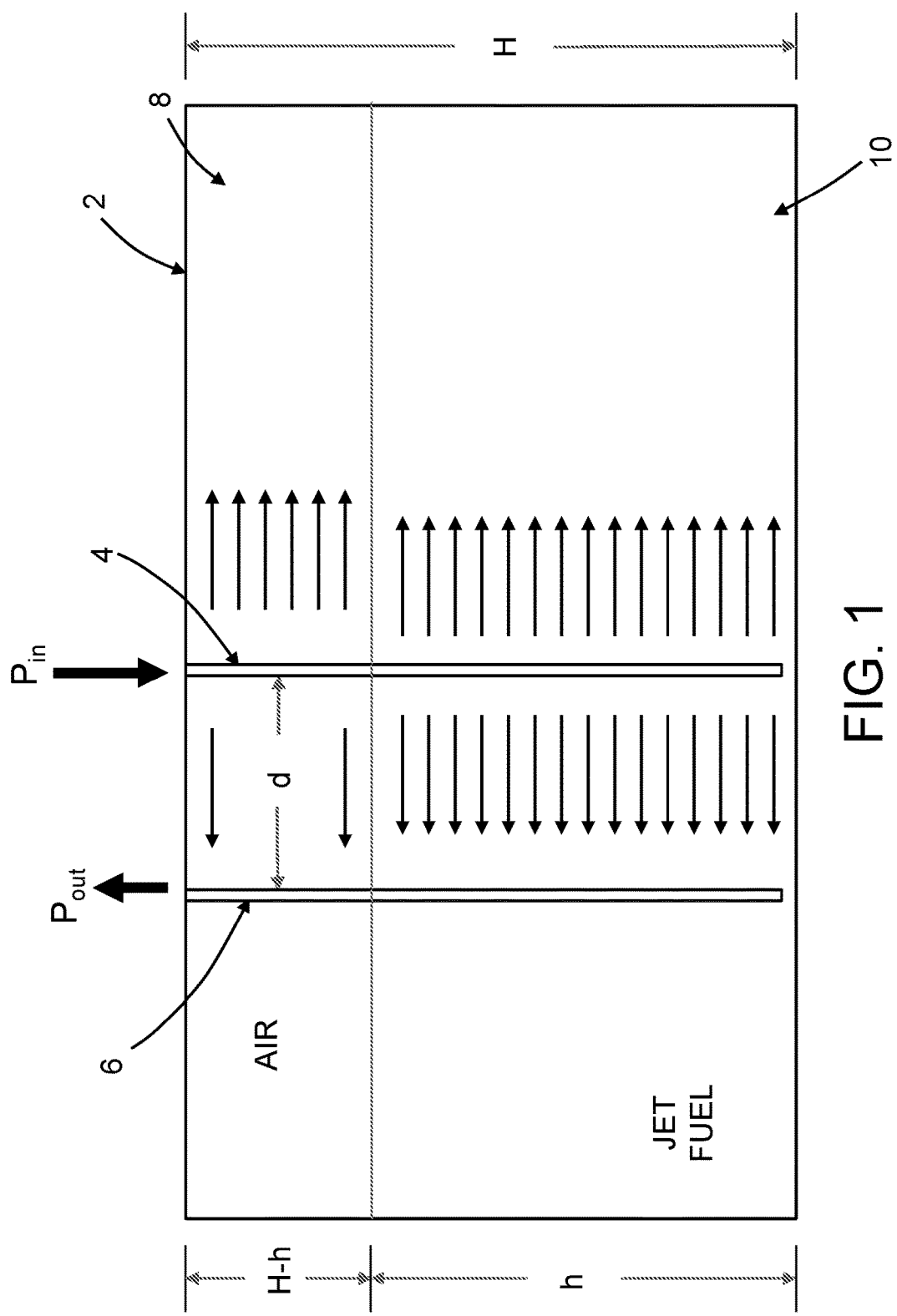
FIG. 1 is a diagram representing a side-emitting plastic optical fiber and a fluorescent plastic optical fiber separated by a distance d inside a fuel tank.

The theoretical underpinning of the fuel level sensor concept disclosed herein will now be described with reference to FIG. 1, which shows a side-emitting plastic optical fiber 4 (hereinafter "SPOF 4") and a fluorescent plastic optical fiber 6 (hereinafter "FPOF 6") separated by a distance d inside a fuel tank 2. A typical diameter of SPOF 4 and FPOF 6 is 1 mm. In the configuration depicted in FIG. 1, light having an optical power $P_{in}$ from a light source (not shown) is input to the SPOF 4. In accordance with various embodiments, the primary light source is a high-power blue LED having a center wavelength in the range of 450 to 500 nm or a laser light source having a center wavelength of 455 nm. The horizontal arrows in FIG. 1 represent the propagation of side-emitted light from SPOF 4. The optical power output $P_{out}$ from the FPOF 6 is red light having a center wavelength at 692 nm after absorbing the blue light from the SPOF 4. $P_{out}$ is highest when the fuel tank 2 is empty. As the fuel level rises, $P_{out}$ decreases. By measuring the change in $P_{out}$, the fuel level change can be derived.

In FIG. 1, the following dimensions are indicated: the fuel level is h; and the total length of each of the SPOF 4 and the FPOF 6 is set equal to H, since the end faces of the two POFs are close to the bottom of the fuel tank 2 and H is close to the height of the fuel tank 2. The side-emitting efficiency per unit area of the SPOF 4 is $\alpha$; $\Gamma$ is the photo response efficiency of the FPOF 6 per unit area. The detailed mathematical derivation of the relationship of optical power output $P_{out}$ versus fuel level h is described by the following equation:

$$P_{out}=P_{oa}+P_{of}=P_i\{[\alpha^2 B(2\pi r)A_{ff}]h^3+[\alpha AA_{fa}-B(2\pi r\alpha^2 H)A_{ff}+\alpha BA_{ff}]h^2-(2 A H\alpha A_{fa})h+\alpha AH^2 A_{fa}\} \quad (1)$$

where $A=(2\pi r)^2 e^{-\beta_a d}$ and $B=(2\pi r)^2 e^{-\beta_f d}$. Physically, as the fuel level changes, $P_{out}$ is the summation of the optical power output ($P_{oa}$) due to absorption of photons from the SPOF 4 by the air 8 and the optical power output (Pof) due to absorption of photons from the SPOF 4 by the fuel 10. $A_{fa}$ is the effective area of the FPOF 6 that is illuminated by the SPOF 4 in the air 8; $A_{ff}$ is the effective area of the FPOF 6 that is illuminated by the SPOF 4 in the fuel 10; r is the radius of each of the SPOF 4 and the FPOF 6 (r is typically about 1 mm): $\beta_a$ is the absorption coefficient of air as the light emitted from SPOF 4 propagates through the air 8; and $\beta_f$ is the absorption coefficient of fuel as the light emitted from SPOF 4 propagates through the fuel 10.

The theoretical relationship of optical power output $P_{out}$ versus fuel level h as shown in Eq. (1) follows a third-order equation in h. This mathematical correlation was demonstrated by experimental results obtained from jet fuel level measurements in a laboratory. The experimental set-up included a SPOF and a FPOF positioned side by side inside a glass tube. Changes in the jet fuel level inside the glass tube were achieved using a small liquid pumping device connecting a plastic tube from a jet fuel container to the glass tube. With the constant-power output from a blue LED coupled into the SPOF, as the fuel level changed, the optical power output $P_{out}$ of the FPOF was measured with an optical power meter.

Figure 2:
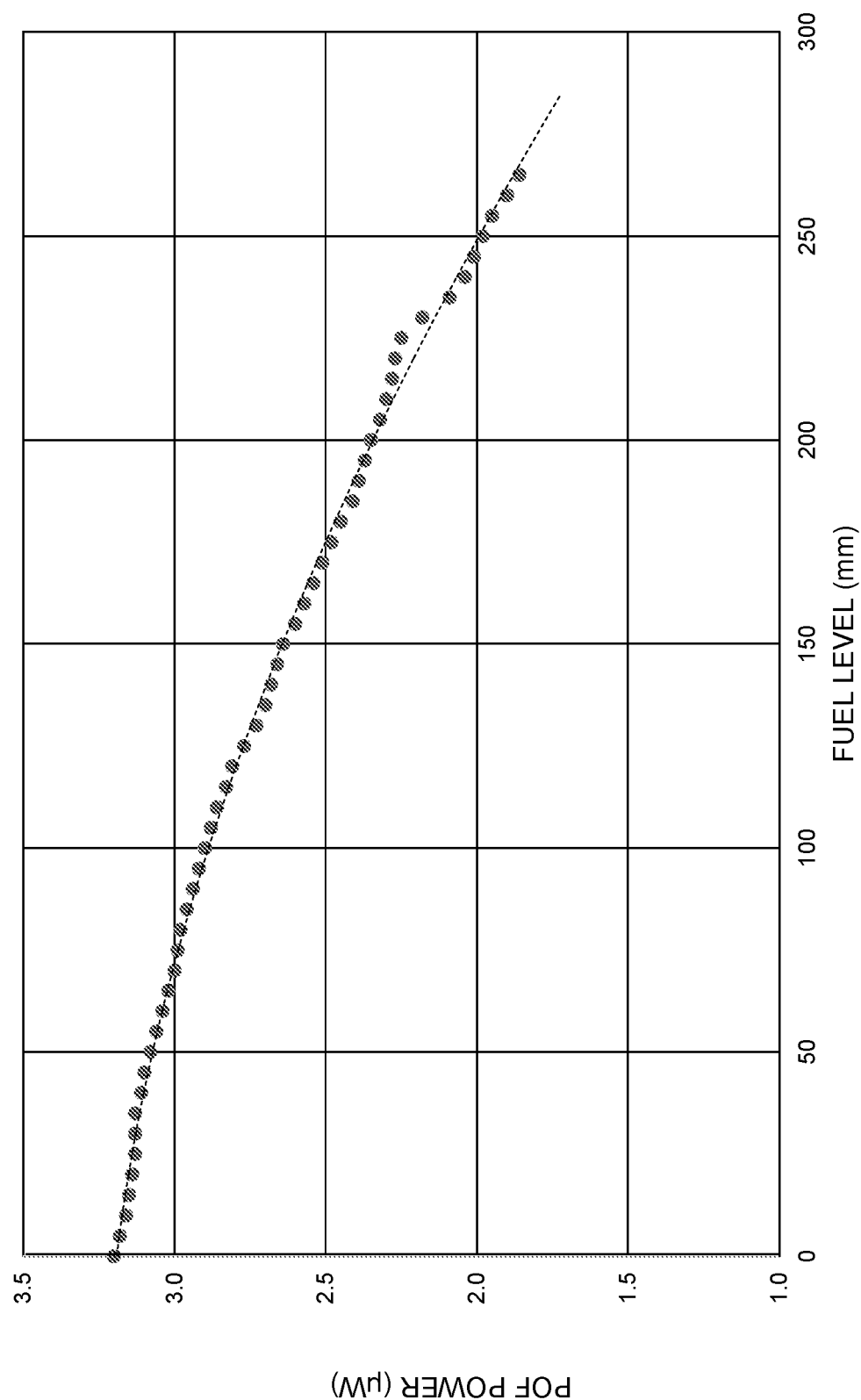
FIG. 2 is a graph showing results of a laboratory experiment in which optical power output and corresponding jet fuel levels were measured. The data points are indicated by solid circles, while a curve fitting those data points is represented by a dotted line.

FIG. 2 is a graph showing optical power output $P_{out}$ of the FPOF versus fuel level h from those experimental measurements. The data points are indicated by solid circles, while a curve fitting those data points is represented by a dotted line. Each data point plotted on the graph is an ordered pair comprising FPOF optical power output (the ordinate) measured in milliwatts versus jet fuel level measurement (the abscissa) measured in millimeters. The experimental data plotted in FIG. 2 shows optical power output $P_{out}$ versus fuel level h fitted very well with a third-order equation. This confirmed the validity of the theoretical derivation of Eq. (1).

In principle, a single SPOF and a single FPOF should be able to provide the fuel level information based on the detected optical power output $P_{out}$ of the FPOF. But in a real airplane fuel tank, there are issues of fuel gunk and residue which can build up on the surfaces of the SPOF and FPOF. This build-up obscures the fuel level (h) measuring accuracy. Another consideration is that the quality of fuel used in an airplane in service can change over time because different countries may provide different grades of fuel at their airports. In addition, the sensor system should have a stable light source (laser or LED) to provide a proper optical power input $P_{in}$ to the SPOF 4 for measuring fuel level h. Also, over time the POFs can age and the SPOF emitting efficiency ($\alpha$) and the FPOF response efficiency ($\Gamma$) can be degraded over time. To overcome these issues, a second FPOF as reference can be used to build a durable fuel level sensor. A dual-FPOF approach is described as follows.

Figure 3:
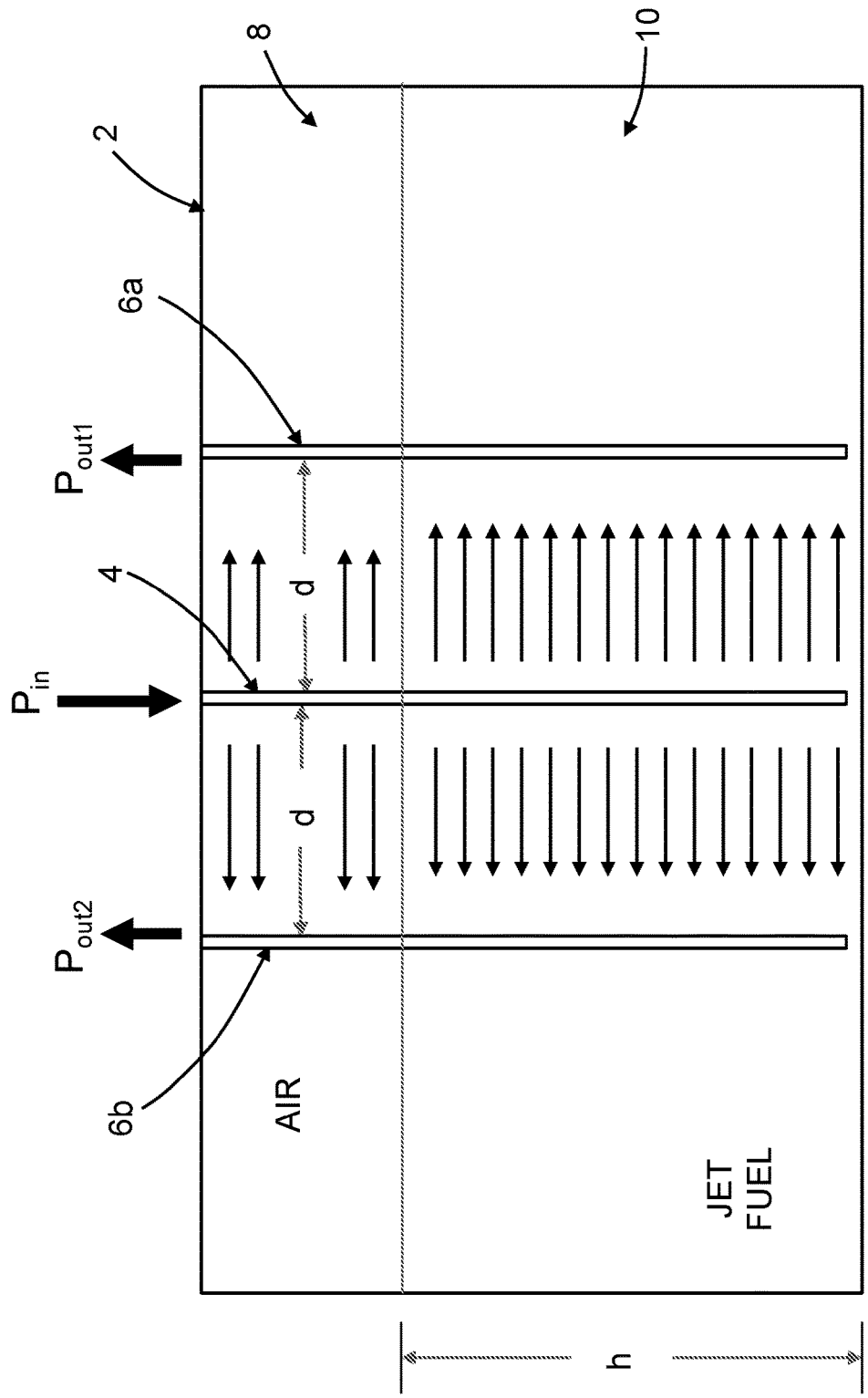
FIG. 3 is a diagram representing two fluorescent plastic optical fibers each positioned at distance d from a side-emitting plastic optical fiber inside a fuel tank.

FIG. 3 shows two FPOFs 6a and 6b that are positioned at the same distance d from a SPOF 4 inside a fuel tank 2. The SPOF 4 and the FPOFs 6a and 6b have the same radius and length. The SPOF 4 receives the optical power input $P_{in}$. The horizontal arrows in FIG. 3 represent the propagation of side-emitted light from SPOF 4. The first and second FPOFs 6a and 6b are designed to have different photo response efficiencies $\Gamma_1$ and $\Gamma_2$. This can be achieved by different doping of the cores of the FPOFs 6a and 6b (e.g., by using different dopants or by using the same dopant at different concentrations). Since the photo response efficiencies $\Gamma_1$ and $\Gamma_2$ of the FPOFs 6a and 6b are different, their respective optical power outputs $P_{out1}$ and $P_{out2}$ will be different.

A wing of an airplane has a height that varies, especially in a spanwise direction. As a consequence, a fuel tank incorporated inside an airplane wing has a height that varies. Typically a wing fuel tank comprises a multiplicity of compartments. It would be desirable to provide fuel level sensors of different lengths which are suitable for installation in fuel tank compartments of different heights. For example, some compartments at the root of a wing may have a height of a few feet, while other compartments near the tip of the wing may have a height of a few inches.

Using the optical power output versus fuel level relationship shown in Eq. (1), the optical power outputs $P_{out1}$ and $P_{out2}$ of the two FPOFs 6a and 6b are respectively given by the following equations:

$$P_{out1}=P_i\Gamma_1\{[\alpha^2 B(2\pi r)A_{ff}]h^3+[\alpha AA_{fa}-B(2\pi r\alpha^2 H)A_{ff}+\alpha BA_{ff}]h^2-(2AH\alpha A_{fa})h+\alpha AH^2 A_{fa}\} \quad (2)$$

$$P_{out2}=P_i\Gamma_2\{[\alpha^2 B(2\pi r)A_{ff}]h^3+[\alpha AA_{fa}-B(2\pi r\alpha^2 H)A_{ff}+\alpha BA_{ff}]h^2-(2AH\alpha A_{fa})h+\alpha AH^2 A_{fa}\} \quad (3)$$

From Eqs. (2) and (3), the following equations can be derived:

$$P_{out2}/P_{out1}=\Gamma_2/\Gamma_1 \quad (4)$$

$$\Gamma_2/\Gamma_1=C_{01} \quad (5)$$

The result of Eq. (4) shows that with two FPOFs, the ratio of their respective optical power outputs is independent of fuel level. The result of Eq. (5) shows that the ratio of the photo response efficiencies $\Gamma_2$ and $\Gamma_1$ and optical power outputs $P_{out2}$ and $P_{out1}$ is equal to a constant $C_{01}$. Using Eqs. (2) and (3), the ratio of the photo response efficiencies $\Gamma_2$ and $\Gamma_1$ can be calculated by measuring the optical power outputs $P_{out1}$ and $P_{out2}$ for each FPOF at any fuel level h.

Figure 4:
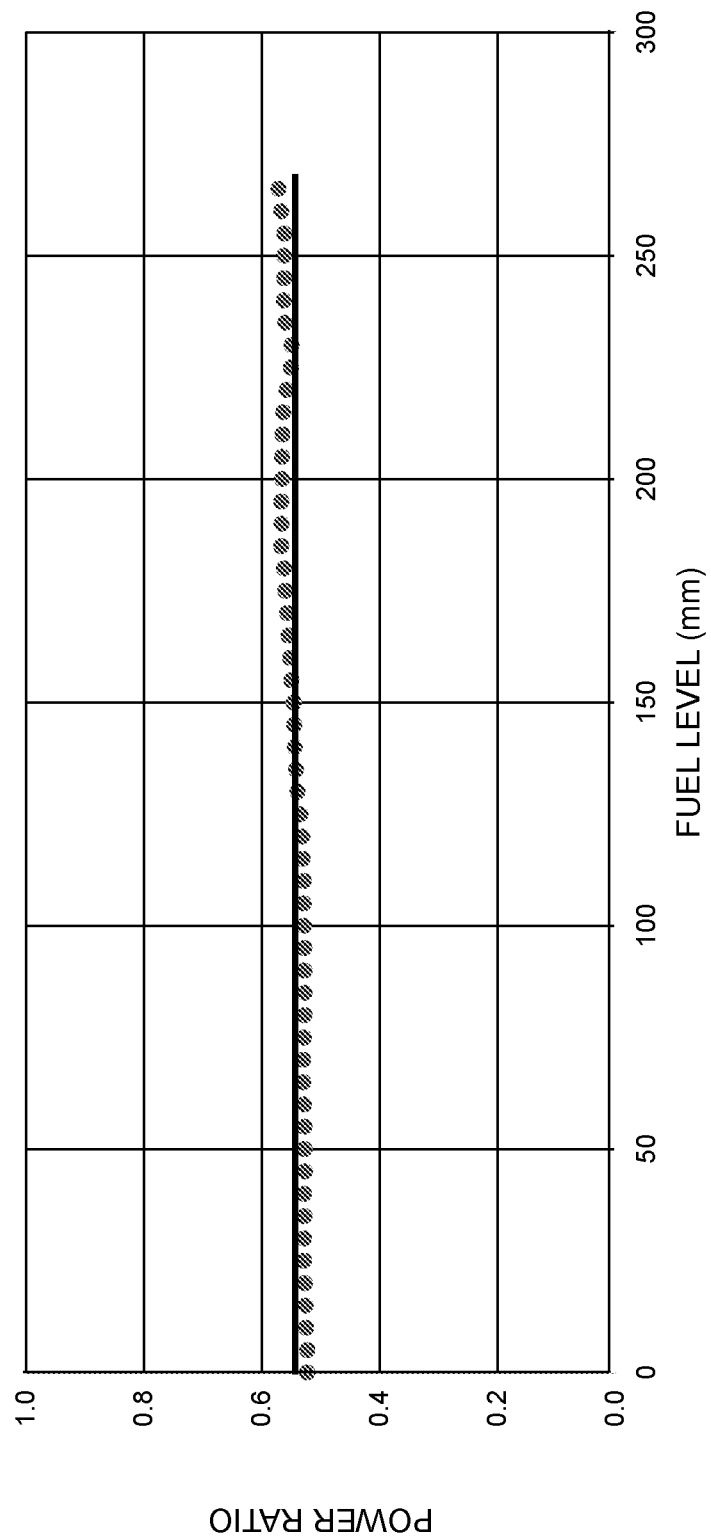
FIG. 4 is a graph showing results of a laboratory experiment in which the ratio of the FPOF optical power outputs ($P_{out1}/P_{out2}$) produced in response to one SPOF input and corresponding jet fuel levels were measured. The data points are indicated by solid circles, while a curve fitting those data points is represented by a bold line.

FIG. 4 is a graph showing results of a laboratory experiment in which the ratio of the FPOF optical power outputs ($P_{out2}/P_{out1}$) produced in response to one SPOF optical power input $P_{in}$ and corresponding jet fuel levels were measured. The data points are indicated by solid circles, while a curve fitting those data points is represented by a bold line. Each data point plotted on the graph is an ordered pair comprising optical power output ratio (the ordinate) versus jet fuel level measurement (the abscissa) measured in millimeters. FIG. 4 shows that the optical power output ratio $P_{out2}/P_{out1}$ is very close to a constant that is independent of fuel level. The experimental results shown in FIG. 4 confirm the theory derived in Eqs. (1) to (5).

Using the results from the above analysis, a dual-FPOF sensor was designed and an implementation was proposed as described below.

Figure 5:
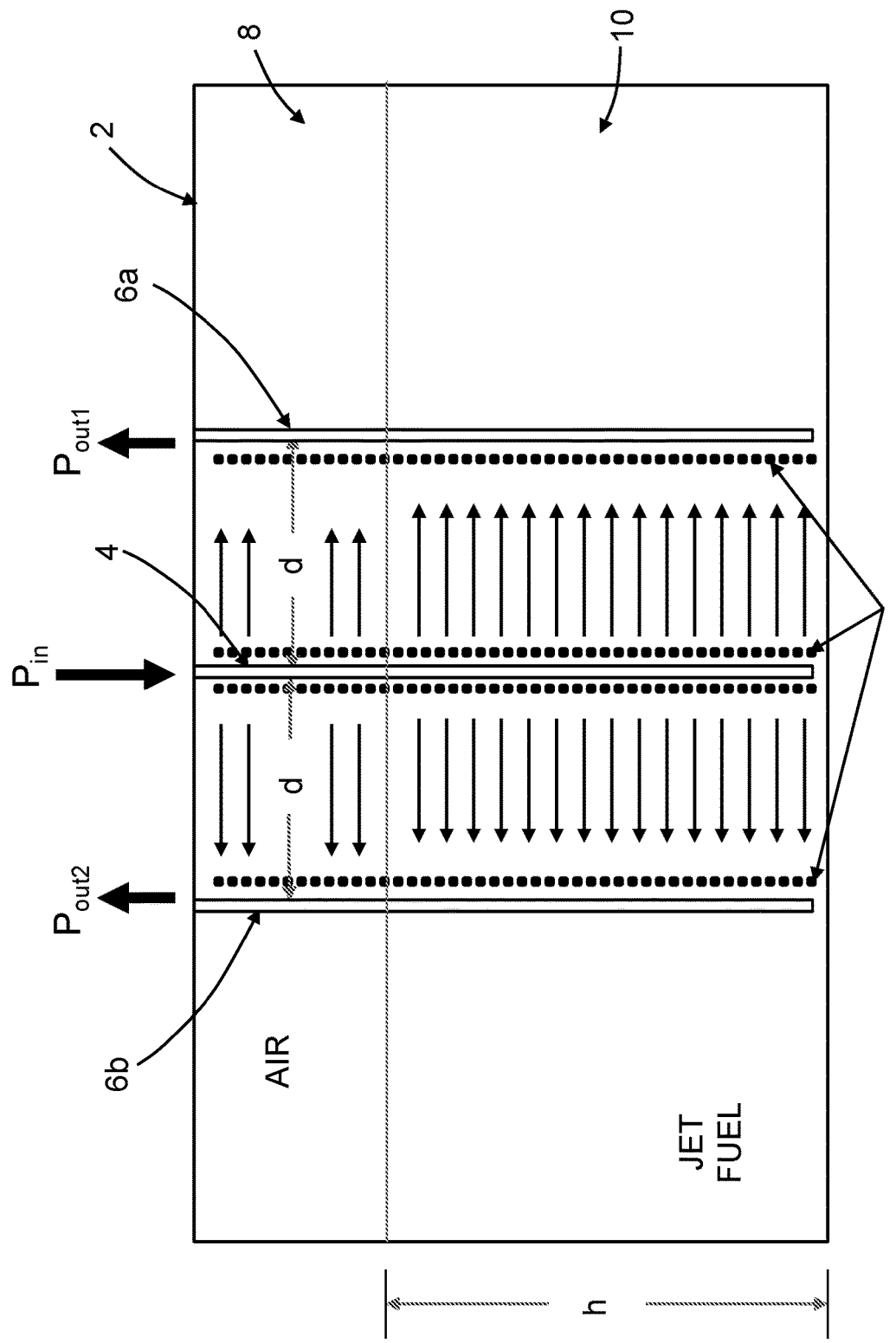
FIG. 5 is a diagram representing two fluorescent plastic optical fibers each positioned at distance d from a side-emitting plastic optical fiber inside a fuel tank containing jet fuel with fuel gunk and residue. The fuel gunk and residue are indicated by solid squares.

FIG. 5 is a diagram representing a fuel level optical sensor comprising two FPOF 6a and 6b having different photo response efficiencies. Each of the FPOFs 6a and 6b is positioned at a distance d from a SPOF 4 inside a fuel tank 2 of an airplane. The fuel tank 2 contains jet fuel 10 with fuel gunk and residue 12 (indicated by small solid squares).

Before operation of the airplane, the installed dual-FPOF fuel level sensor depicted in FIG. 5 should be calibrated. This dual-FPOF fuel level sensor uses one of the FPOFs (e.g., FPOF 6a) as the measurement POF and the other FPOF (e.g., FPOF 6b) as the reference POF. During the calibration procedure, the fuel level versus optical power outputs $P_{out1}$ and $P_{out2}$ are recorded, and the ratio $P_{out2}/P_{out1}$ is calculated and recorded. The resulting value is the constant $C_{01}$.

Later, during operation of the airplane, the optical power output $P_{out1}$ from the measurement FPOF 6a is used to indicate the fuel level based on the data from the calibration. But over the lifetime of the sensor being used in the airplane, fuel gunk and residue 12 will be deposited on the SPOF 4 and the FPOFs 6a and 6b as shown in FIG. 5, the POFs age over the lifetime of the airplane, and also the fuel quality will vary for an airplane in service. All of these factors may effectively reduce the respective photo response efficiencies $\Gamma_1$ and $\Gamma_2$ of the two FPOFs 6a and 6b. But by using a fuel level electronics processor (not shown in FIG. 5) to continually monitor and regulate the attenuation of the optical power outputs $P_{out1}$ and $P_{out2}$ of the two FPOF 6a and 6b and continually adjust the optical power input $P_{in}$ to the SPOF 4, the effects of gunk, residue, POF aging and fuel quality variation can be compensated so that the optical power output $P_{out1}$ versus fuel level measurement is unchanged over the lifetime of the dual-FPOF fuel level sensor being used in the airplane.

Still referring to FIG. 5, the fuel gunk and residue 12 reduces the input optical power that illuminates the surfaces of the FPOFs 6a and 6b. The POF aging reduces the SPOF emitting efficiency a and the photo response efficiencies $\Gamma_1$ and $\Gamma_2$. Similarly, the change in fuel quality also has the same effect in reducing the optical power outputs $P_{out1}$ and $P_{out2}$ of the FPOFs 6a and 6b. The design of the dual-FPOF fuel level sensor compensates for the effects of gunk, residue, POF aging and fuel quality variation in part by increasing the optical power input $P_{in}$ to the SPOF 4.

Figure 6:
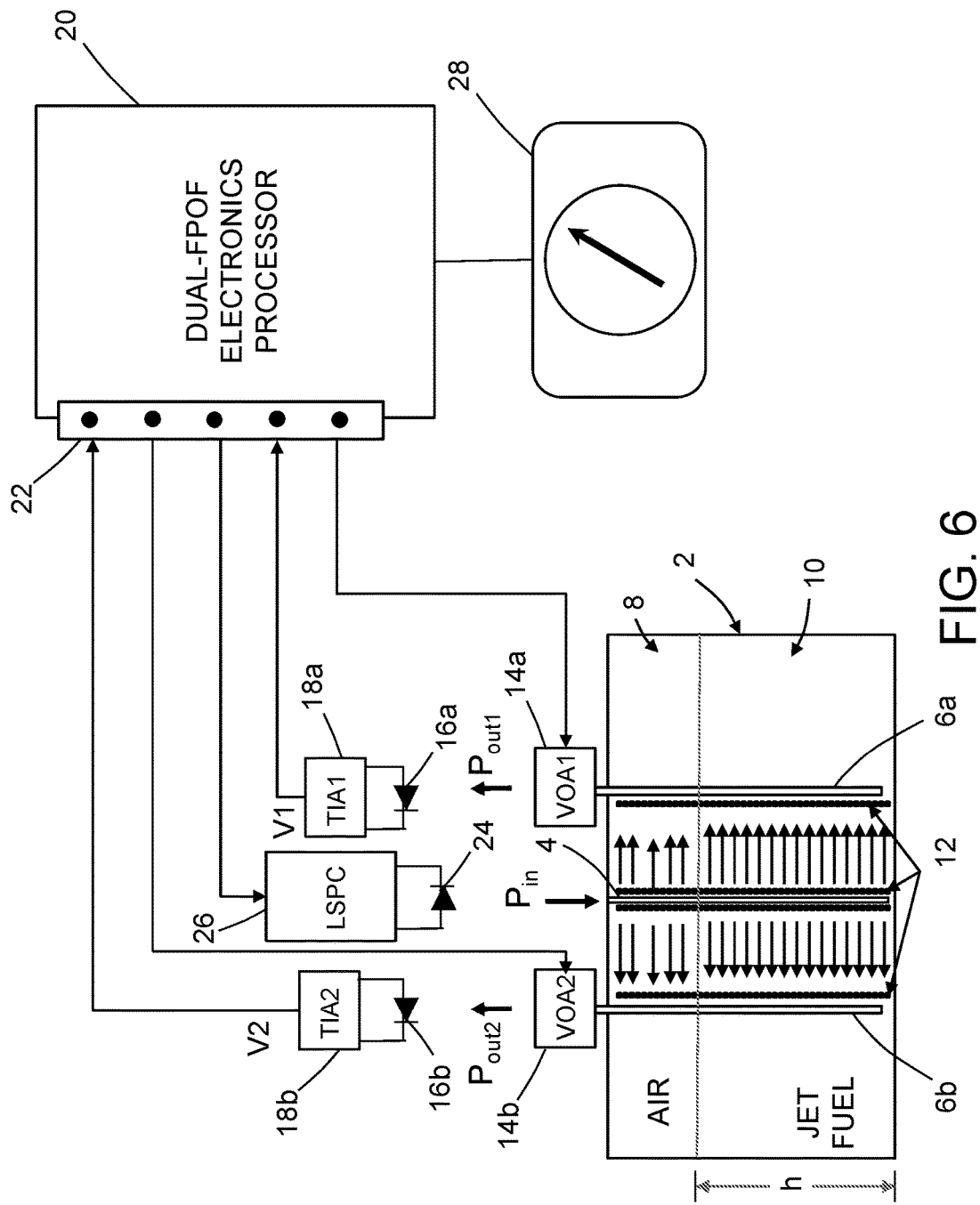
FIG. 6 is a hybrid diagram showing the design of a dual-FPOF fuel level sensor having an electronics processor configured to compensate for the effects of fuel gunk, residue, POF aging effects and fuel quality variation.

FIG. 6 shows the dual-FPOF design and its electronics processor 20 (or controller), which is configured to achieve stable and reliable fuel level sensing. FIG. 6 also shows the controller electronic functions which are designed to maintain constant ratio of the photo response efficiencies $\Gamma_1$ and $\Gamma_2$ over the lifetime of the sensor's operation.

As shown in FIG. 6, the output of FPOF 6a is connected to a first variable optical attenuator 14a (indicated by the block labeled VOA1), while the output of FPOF 6b is connected to a second variable optical attenuator 14b (indicated by the block labeled VOA2). These variable optical attenuators are optical attenuators which attenuate (i.e., reduce the intensity of) the FPOF optical power outputs by applying external voltages. The degree of attenuation can be regulated by changing the magnitudes of the applied external voltages. The regulation of the magnitudes of the external voltages applied to the first and second variable optical attenuators 14a and 14b is controlled by respective control signals received from the electronics processor 20 through the electrical connector 22, which is electrically coupled to the electronics processor 20 as shown in FIG. 6.

The one-time calibration is performed while the completed dual-FPOF fuel level sensor is in the airplane's fuel tank 2. During this first calibration, the photo response efficiencies $\Gamma_1$ and $\Gamma_2$ of FPOFs 6a and 6b are measured as $\Gamma_{01}$ and $\Gamma_{02}$ respectively, and then the constant $C_{01}$ is determined by calculating the ratio $\Gamma_{02}/\Gamma_{01}$. The design of the dual-FPOF fuel level sensor uses FPOF 6a as the fuel level sensing FPOF and FPOF 6b as the reference FPOF. Initially, the FPOFs 6a and 6b are fabricated such that the photo response efficiency $\Gamma_{01}$ of FPOF 6a is larger than the photo response efficiency $\Gamma_{02}$ of FPOF 6b. During the calibration procedure, electronic digital data representing the fuel levels versus optical power outputs of both $P_{out1}$ and $P_{out2}$ are recorded in a look-up table stored in a non-transitory tangible computer-readable storage medium, such as the non-volatile memory of an electronics processor 20. In addition, a third-order equation is derived that fits the digital calibration data. This third-order equation can be used to interpolate between two stored values in the look-up table when the optical power output $P_{out1}$ is a value between those two stored values. The relationship of fuel level h versus $P_{out1}$ is derived from the measurement data acquired during calibration and stored (as electronic digital data) in the processor's memory.

The FPOFs 6a and 6b are respectively connected to the first and second variable optical attenuators 14a and 14b. The optical power outputs $P_{out1}$ and $P_{out2}$ from the first and second variable optical attenuators 14a and 14b are optically coupled to first and second optical detectors 16a and 16b respectively. The magnitude of the signals output by the first and second optical detectors 16a and 16b increases monotonically with increasing intensity of light emitted from the ends of FPOFs 6a and 6b. The photo-current output from the first optical detector 16a is electrically coupled to a first transimpedance amplifier 18a (indicated by the block labeled TIA1) and the photo-current output from the second optical detector 16b is electrically coupled to a second transimpedance amplifier 18b (indicated by the block labeled TIA2). A transimpedance amplifier is a current-to-voltage converter, most often implemented using an operational amplifier. The first and second transimpedance amplifiers 18a and 18b convert the photo-currents to respective voltages V1 and V2 which are linearly proportional to the optical power outputs $P_{out1}$ and $P_{out2}$ from the first and second variable optical attenuators 14a and 14b. The voltages V1 and V2 are applied to respective input ports of the electronics processor 20 through the electrical connector 22 as shown in FIG. 6.

The light source 24 that provides the optical power input $P_{in}$ to the SPOF 4 is either a high-power LED or a laser. In accordance with one embodiment, the light source 24 emits light with a center wavelength of 455 nm (blue), because a light source at this wavelength has high photon energy for optical excitation of the FPOFs 6a and 6b. (Additional details concerning the light source are provided below.) The wavelength of the light output by the FPOFs 6a and 6b has a narrow spectral bandwidth with a center wavelength of 692 nm (red). The horizontal arrows in FIG. 6 represent light (i.e., photons) propagating from the SPOF 4 to the FPOFs 6a and 6b during operation of light source 24. The light source 24 is electrically coupled to a light source power controller 26 (indicated by the block labeled LSPC in FIG. 6) which is configured to stabilize the optical power input $P_{in}$ during variations in temperature and over the lifetime of the dual-FPOF fuel level sensor's operation in response to control signals from the electronics processor 20.

The electronics processor 20 is configured to send the fuel level data to a fuel level indicator 28 in the airplane. The electronics processor 20 may be a dedicated microprocessor or a general-purpose computer, and may calculate the measured level (i.e., height) of the fuel by using a look-up table, a calibration curve, or by solving equations, as appropriate. The fuel level indicator 28 may present information that identifies the amount of fuel present within the fuel tank 2 based on optical power data received by the electronics processor 20. The fuel level indicator 28 may take the form of a display device having a display processor programmed to display the measurement results (e.g., the fuel level) graphically and/or alphanumerically on a display screen.

Still referring to FIG. 6, the electronics processor 20 may be a computer or part of a flight control system located on an airplane. In identifying the amount of fuel present in an irregular-shaped fuel tank, the electronics processor 20 may execute various routines to calculate the amount of fuel present based on optical power data received from respective pairs of FPOFs 6a and 6b appropriately placed in various compartments of the fuel tank 2. The fuel information processing software may include routines that take into account the shape of the fuel tank 2 to determine the amount of fuel remaining in the fuel tank 2. The fuel information processing software may further include routines for calibrating processes to form a baseline before a first use or to maintain accuracy of fuel readings. The readings provided by the electronics processor 20 to the fuel level indicator 28 may be integrated or averaged before presentation and may be provided at different time intervals.

Figure 7:
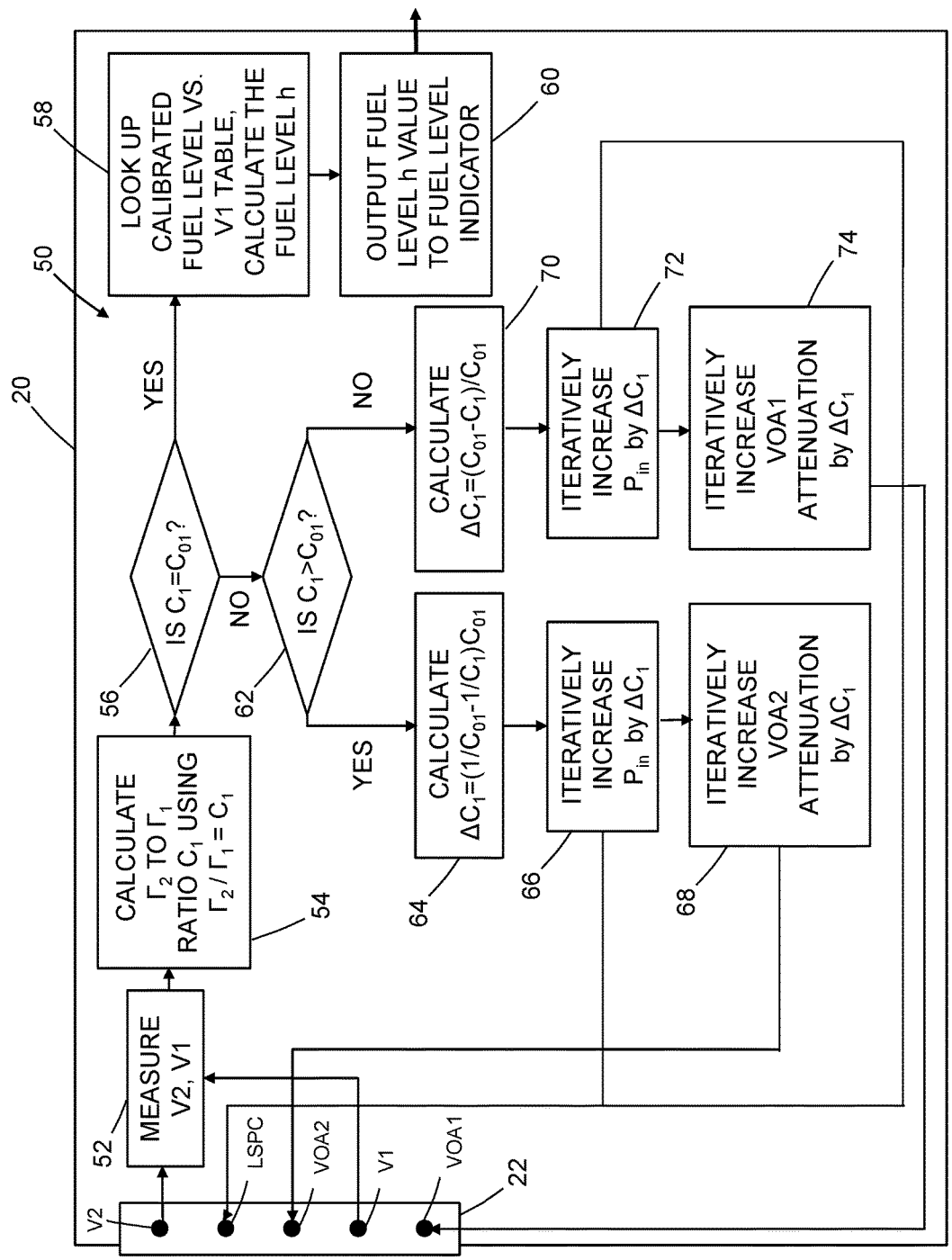
FIG. 7 is a flowchart identifying steps of an iterative algorithm performed by the electronics processor of the dual-FPOF fuel level sensor in accordance with one example.

FIG. 7 is a flowchart identifying steps of an iterative algorithm performed by the electronics processor 20 in accordance with one example. Based on the above-described fuel level measurement theory and Eqs. (4) and (5), the electronics processor 20 is configured to convert the analog voltages V1 and V2 into digital data (step 52) and then calculate the ratio $\Gamma_2/\Gamma_1 = V2/V1 = C_1$ (step 54). Before sending the fuel level data to the fuel level indicator 28 in the airplane (step 60), the electronics processor 20 determines whether $C_1 = C_{01}$ or not (step 56).

If in step 56 the electronics processor 20 detects that the ratio $\Gamma_2/\Gamma_1 = C_1$ does not deviate from the constant $C_{01}$, the electronics processor 20 uses V1 (which is linearly proportional to $P_{out1}$) to look up the fuel level h in a lookup table (step 58). If the magnitude of V1 falls between higher and lower values stored in the lookup table, then the previously described third-order equation can be used to calculate the fuel level h. The fuel level h is then output to the fuel level indicator 28 (step 60).

If in step 56 the electronics processor 20 detects that $C_1$ (equal to the ratio $\Gamma_2/\Gamma_1$) deviates from (i.e., is not equal to) the predetermined constant $C_{01}$, then the electronics processor 20 increases the optical power input $P_{in}$ through the light source power controller 26, and adjusts the level of attenuation of one or both of the first and second variable optical attenuators 14a and 14b to achieve a stable ratio $\Gamma_2/\Gamma_1$. The electronics processor 20 determines whether $C_1 > C_{01}$ or not (step 62).

If $C_1 > C_{01}$, then the electronics processor 20 performs the following calculation (step 64):

$$\Delta C_1 = (1/C_{01} - 1/C_1) C_{01} \quad (6)$$

The electronics processor 20 then generates a control signal instructing the light source power controller 26 to increase the optical power input $P_{in}$ by $\Delta C_1$ (step 66) and a control signal instructing the second variable optical attenuator 14b to increase attenuation by $\Delta C_1$ (step 68). These adjustment steps are performed iteratively.

Conversely, if $C_1$ is not greater than $C_{01}$, then the electronics processor 20 performs the following calculation (step 70):

$$\Delta C_1 = (C_{01} - C_1)/C_{01} \quad (7)$$

The electronics processor 20 then generates a control signal instructing the light source power controller 26 to increase the optical power input $P_{in}$ by $\Delta C_1$ (step 72) and a control signal instructing the first variable optical attenuator 14a to increase attenuation by $\Delta C_1$ (step 74). These adjustment steps are performed iteratively.

When a ratio $\Gamma_2/\Gamma_1 = C_{01}$ is achieved after the iterative process, the electronics processor 20 performs the fuel level calculation (step 58) based on the V1 value from FPOF 6a and then outputs the fuel level information to the airplane's fuel level indicator 28 (step 60), where V1 is linearly proportional to $P_{out1}$.

An alternative light source selection for the optical power input $P_{in}$ is an ultraviolet light source (e.g., LED or laser) having a wavelength in a range from 200 to 400 nm. An ultraviolet light source has higher photon energy than a blue light source. Therefore the ultraviolet light source increases the photo response efficiencies $\Gamma_1$ and $\Gamma_2$ of the FPOFs. An ultraviolet light source also has the capability to clear and reduce the amount of gunk and residue deposited on the surfaces of the SPOF and FPOFs, thereby increasing the operating lifetime of the dual-FPOF fuel level sensor.

A detailed hardware design of a POF assembly in accordance with one embodiment is shown in FIGS. 8-17. The fully assembled POF assembly comprises at least the following elements: one SPOF 4, two FPOFs 6a and 6b, three glass tubes 30a-30c, three composite holding rods 32a-32c, two end caps 34 and 36, a composite outer tube 38, and an optical fiber holding cylinder 40.

Figure 8:
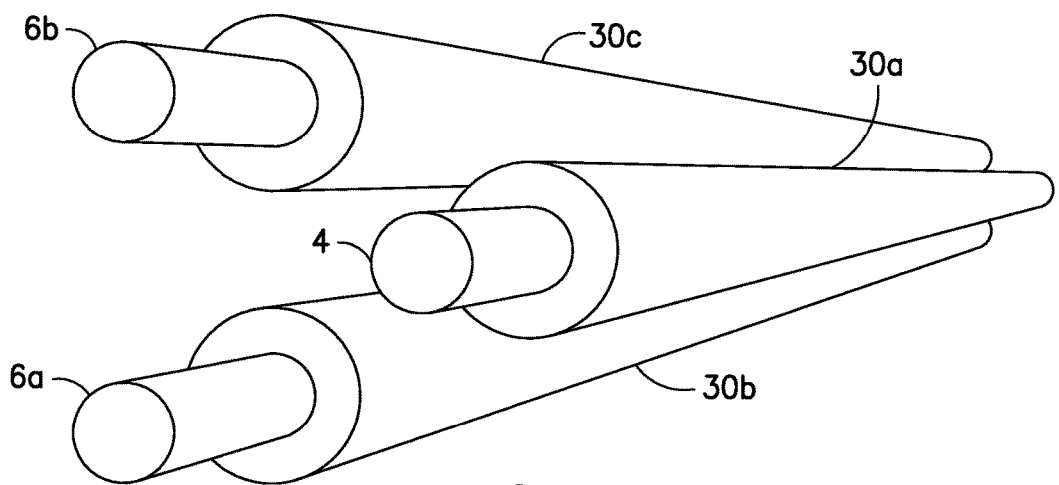

FIG. 8 shows a perspective view of one SPOF 4 and two FPOFs 6a and 6b arranged in parallel with the center axes of the three POFs located at the vertices of an equilateral triangle in accordance with one embodiment. A major portion of the SPOF 4 is embedded in a glass tube 30a having high strength using optically transparent epoxy with good refractive index matching to the glass tube 30a. The length of the SPOF 4 is greater than the length of glass tube 30a, with one end of the SPOF 4 terminating at one end of glass tube 30a and the other end of the SPOF 4 extending beyond the other end of glass tube 30a. Similarly, major portions of the FPOFs 6a and 6b are embedded in respective glass tubes 30b and 30c having high strength using optically transparent epoxy with good refractive index matching to the glass tubes. The length of the FPOF 6a is greater than the length of glass tube 30b, with one end of the FPOF 6a terminating at one end of glass tube 30b and the other end of the FPOF 6a extending beyond the other end of glass tube 30b. Similarly, the length of the FPOF 6b is greater than the length of glass tube 30c, with one end of the FPOF 6b terminating at one end of glass tube 30c and the other end of the FPOF 6a extending beyond the other end of glass tube 30c. The terminal portions of SPOF 4 and FPOFs 6a and 6b that extend beyond the glass tubes 30a-30c will be referred to hereinafter as "non-embedded portions".

Figure 9:
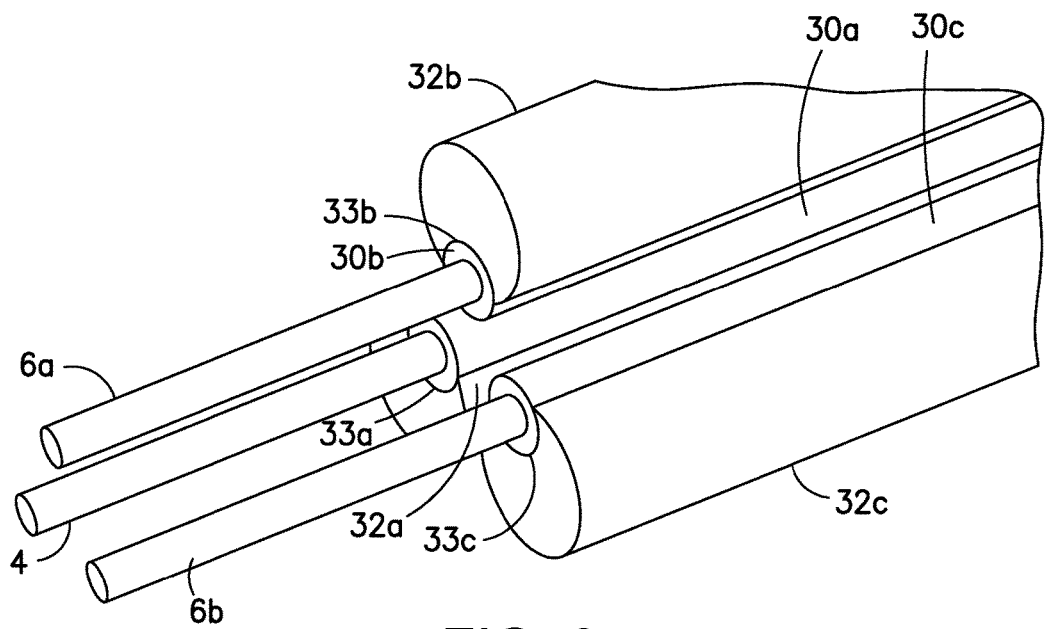

After embedding major portions of the SPOF 4 and FPOFs 6a and 6b inside the glass tubes 30a-30c, the three glass tubes 30a-30c are seated in respective grooves 33a-33c formed in respective composite holding rods 32a-32c (see FIG. 9). As seen in FIG. 9, the glass tubes 30a-30c are partly embedded in and partly protruding out of the associated composite holding rods 32a-32c. The composite holding rods 32a-32c support and partially protect the associated glass tubes 30a-30c. In accordance with one embodiment, the grooves 33a-33c in composite holding rods 32a-32c have semicircular profiles with a radius slightly greater than the radius of the glass tubes 30a-30c.

Figure 10:
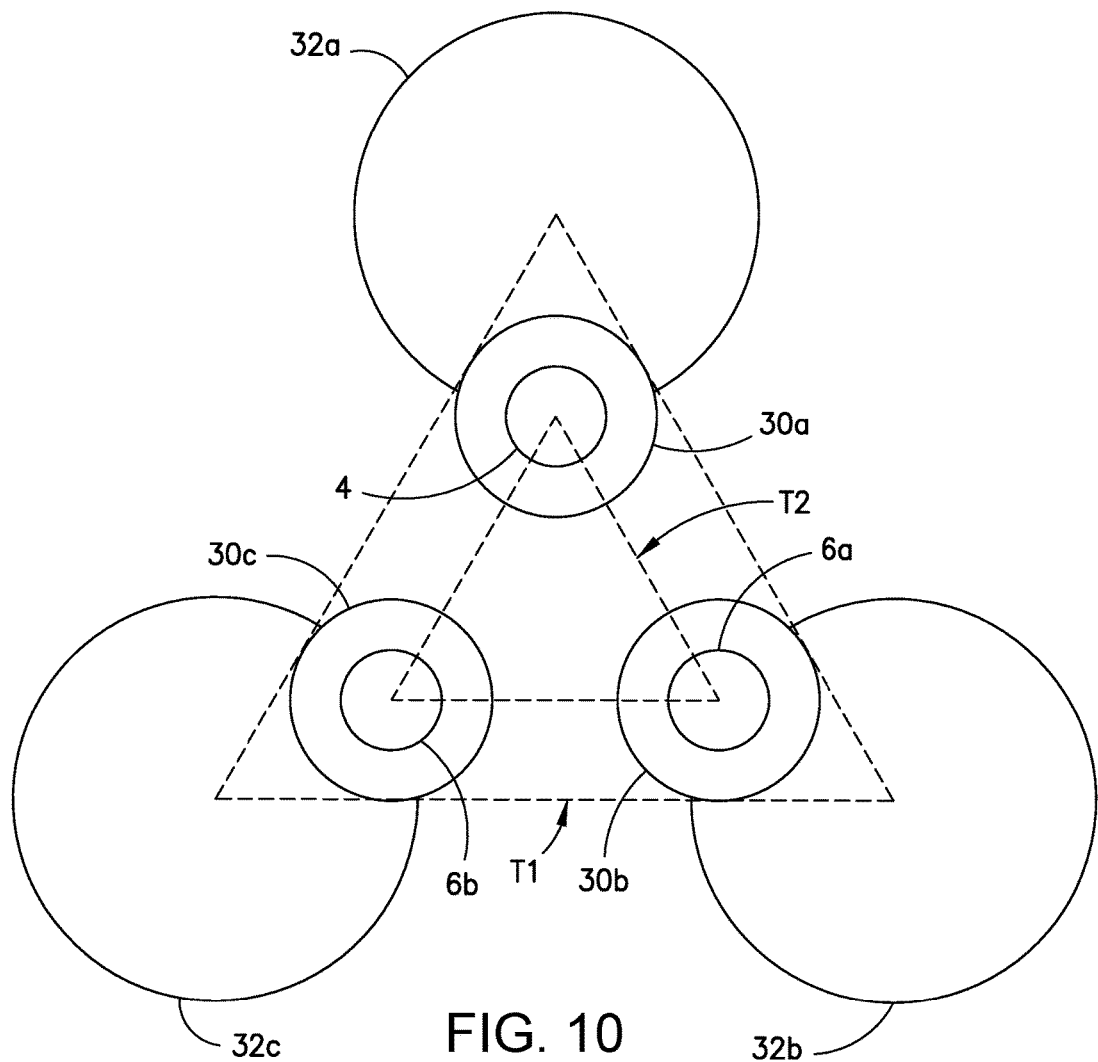

FIG. 10 is a diagram representing an end view of the composite holding rods 32a-32c positioned and oriented (i.e., located) so that their center axes are positioned at the vertices of a first equilateral triangle T1 (indicated by dashed lines) and the center axes of the SPOF 4 and FPOFs 6a and 6b are positioned at the vertices of a second equilateral triangle T2 (indicated by dashed lines) that is inside the first equilateral triangle T1. The vertices of the second equilateral triangle T2 are separated from the respective vertices of the first equilateral triangle T1 by the same distance. In accordance with an alternative embodiment, the composite holding rods 32a-32c may be located so that their center axes are positioned at the vertices of an isosceles triangle, with each of the FPOFs 6a and 6b being separated from the SPOF 4 by a first distance and the FPOFs 6a and 6b being separated from each other by a second distance different than the first distance. As shown in FIG. 10, SPOF 4 and glass tube 30a are concentric with each other, FPOF 6a and glass tube 30b are concentric with each other, and FPOF 6b and glass tube 30a are concentric with each other.

In accordance with one example, the elements shown in FIG. 10 have the following dimensions: the SPOF 4 and FPOFs 6a and 6b each have a diameter of 1 mm; the glass tubes 30a-30c each have a diameter of 2 mm; the composite holding rods 32a-32c each have a diameter of 4 mm; the center axis of the respective POF is located off-center from the center axis of the associated composite holding rod by a distance of 2 mm; and the center axes of the FPOFs 6a and 6b are separated from the center axis of the SPOF 4 and from each other by a distance of 3.25 mm. In other words, the sides of equilateral triangle T2 having a length of 3.25 mm. These dimensions can be modified based on the airplane's system requirements.

FIG. 11 is a diagram representing a side view of the composite holding rods 32a-32c (with partially embedded glass tubes 30a-30c) depicted in FIGS. 9 and 10. As seen in FIG. 11, respective non-embedded portions of the SPOF 4 and FPOFs 6a and 6b extend beyond the ends of the respective glass tubes 30a-30c.

FIG. 12 is a diagram representing an exploded isometric view of an end-cap assembly comprising the components shown in FIGS. 8-11 and additional components, namely, a pair of end caps disposed at opposite ends thereof to hold the composite holding rods 32a-32c at their respective locations depicted in FIG. 10. (As used herein, the term "location" comprises position in a fixed three-dimensional coordinate system and orientation relative to that coordinate system.) More specifically, one end of each of the SPOF 4 and FPOFs 6a and 6b is held in place by the top end cap 34 and one end of each of the composite holding rods 32a-32c is held in place by the bottom end cap 36. The top and bottom end caps 34 and 36 can be either press fit or epoxy bonded to composite holding tubes 32a-32c.

As best seen in FIG. 15, the top end cap 34 comprises a first portion 34a integrally formed with a second portion 34b. The first portion 34a has a circular cylindrical outer surface with a first radius; the second portion 34b has a circular cylindrical outer surface with a second radius less than the first radius. The top end cap 34 can be made from thermoplastic composite materials.

Referring again to FIG. 12, the top end cap 34 has a central opening 46 and two additional openings 48a and 48b disposed on opposite sides of opening 46. The openings 46, 48a and 48b may be elliptical or oval. The openings, 48a and 48b extend axially through the first and second portions 34a and 34b of the top end cap 34.

As best seen in the end view of FIG. 13, an optical fiber holding cylinder 40 is seated in the central opening 46 and has three openings through which the SPOF 4 and FPOFs 6a and 6b will be passed. Although the example depicted in FIG. 13 shows an optical fiber holding cylinder 40 having an elliptical shape, the optical fiber holding cylinder 40 may have a geometry other than elliptical.

As seen in FIG. 17, the ends of the SPOF 4 and FPOFs 6a and 6b extend through (indicated by dashed lines) and beyond the optical fiber holding cylinder 40. These optical fibers ends will be connected to external optical fibers outside fuel tank 2 by respective optical connectors (not shown in the drawings) at the wall of the fuel tank 2. One of those optical connectors will connect the SPOF 4 to an external optical fiber (not shown in the drawings) that optically couples the SPOF 4 to the light source 24. The other two optical connectors will connect the FPOFs 6a and 6b to respective external optical fibers (not shown in the drawings) that optically couple the FPOFs 6a and 6b to the first and second variable optical attenuators 14a and 14b respectively (shown in FIG. 6).

FIG. 14 is a diagram representing a plan view of the bottom end cap 36. The bottom end cap 36 has a circular cylindrical outer surface with a radius equal to the second radius of the second portion 34b of the top end cap 34. The bottom end cap 36 can be made from thermoplastic composite materials. The bottom end cap 36 has three openings 42a-42c for receiving one end of each of the respective composite holding rods 32a-32c with partially embedded glass tubes 30a-30c. The openings 42a-42c in bottom end cap 36 align and hold the three composite holding rods 32a-32c with partially embedded glass tubes 30a-30c in the locations depicted in FIG. 10. The bottom end cap 36 further has a pair of openings 44a and 44b disposed on opposite sides of the array of three openings 42a-42c. All of the openings 42a-42c, 44a and 44b extend axially through the bottom end cap 36.

Since the SPOF 4 and FPOFs 6a and 6b are respectively fixed relative to the composite holding rods 32a-32c that hold them, the top and bottom end caps 34 and 36 have the effect of holding the SPOF 4 and FPOFs 6a and 6b in alignment at fixed distances from each other. More specifically, the openings 42a-42c in the bottom end cap 36 (best seen in FIG. 14) and the openings in the optical fiber holding cylinder 40 hold the SPOF 4 and FPOFs 6a and 6b at the desired positions depicted in FIG. 10. Additional structures inside the composite outer tube 38 can be used to support the middle section of each of the embedded SPOF 4 and FPOFs 6a and 6b (this structure is not shown in the drawings). The top and bottom end caps 34 and 36, together with the supporting structure inside the composite outer tube 38, enable the SPOF 4 and FPOFs 6a and 6b to withstand the extreme vibration and temperature environment in the airplane's fuel tank 2.

FIG. 15 is a diagram representing a side view of the end-cap assembly comprising three composite holding rods 32a-32c (with partially embedded glass tubes) having top and bottom end caps 34 and 36 at opposite ends thereof. This end-cap assembly is coupled to the composite outer tube 38 in the manner depicted in FIG. 16, which combination is referred to herein as "the POF assembly". The composite outer tube 38 is a circular cylindrical tube having an inner radius which is slightly greater than the outer radius of bottom end cap 36 and portion 34b of top end cap 34. The outer circumferential surface of portion 34a of top end cap 34 has external threads. The threaded end-cap assembly is screwed into the outer composite tube 38. As seen in FIG. 16, the entire end-cap assembly depicted in FIG. 15 is inserted inside the composite outer tube 38 except for portion 34a of top end cap 34.

As previously mentioned, FIG. 17 shows a partially sectioned view of the POF assembly depicted in FIG. 16. Only the top end cap 34 and the composite outer tube 38 are shown in section, the section being taken in the plane of the paper as seen in FIG. 17. As seen in FIG. 17, the upper ends of the composite holding rods 32a-32c (i.e., the ends on the left-hand side) are seated with a form-fitting relationship inside respective recesses formed in portion 34b of top end cap 34, three circular feed through holes for the SPOF and the two FPOFs in portion 34a, while the lower ends of the composite holding rods 32a-32c (i.e., the ends on the right-hand side) are seated with a form-fitting relationship inside respective openings 42a-42c opening formed in bottom end cap 36. The empty spaces inside the composite outer tube 38 (including the empty space between the glass holding tubes 30a-30c disposed within triangle T2 seen in FIG. 10) will be filled with fuel during fuel level measurement. The openings 44a and 44b (see FIG. 14) in the bottom end cap 36 allow fuel to flow into the composite outer tube 38 when the POF assembly depicted in FIGS. 16 and 17 is inserted into the airplane fuel tank 2.

Although not shown in the drawings, each optical fiber is a flexible, optically transparent or translucent fiber made of extruded glass or plastic. It can function as a waveguide or light pipe to transmit light between the two ends of the fiber. Optical fibers typically include a transparent or translucent core having a relatively higher index of refraction surrounded by a transparent or translucent cladding material having a relatively lower index of refraction. Light is kept in the core by total internal reflection. This causes the optical fiber to act as a waveguide.

In accordance with the embodiments disclosed herein, the cladding of the SPOF 4 is modified (e.g., by roughening or notching the circumferential surface) to enable a controlled level of radial light side-emitted along the fiber's length. More specifically, the cladding of SPOF 4 may be treated to produce a non-uniform surface in two areas bounded by respective longitudinal slots in a jacket. For example, the outer surface of the cladding may be roughened or notched in two area overlapped by respective longitudinal slots in a jacket, thereby forming two side windows. The cladding of the FPOFs 6a and 6b may be modified in a similar manner to form respective side windows that face toward the respective side windows of SPOF 4 when the optical sensor is installed inside a fuel tank 2.

In accordance with the embodiments disclosed herein, the cores of FPOFs 6a and 6b have different fluorescing dopants or different concentrations of the same fluorescing dopant such that the photo response efficiencies of the FPOFs 6a and 6b will be different. The cores of FPOFs 6a and 6b can be activated by light from the SPOF 4 impinging on the side windows of FPOFs 6a and 6b and then entering the cores. (Fluorescence occurs when an orbital electron relaxes to its ground state by emitting a photon of light after being excited to a higher quantum state by some type of energy.) The fluorescing dopants produce light which travels along the length of the FPOFs 6a and 6b and is then output to the first and second optical detectors 16a and 16b by way of the first and second variable optical attenuators 14a and 14b respectively.

In the example shown in FIG. 6, optical fibers are used to measure the level of fuel in a fuel tank 2. In other embodiments, the same apparatus may be used to detect other liquids. For example, the system described above may be used to detect the presence of water in a container or hydraulic fluids in a reservoir for a hydraulic system. The illustration of detecting fuel in a fuel tank is presented for purposes of illustration and not meant to limit the manner in which the system shown in FIG. 6 may be used.

The side-emitting optical fiber and the two receiving (fluorescent) optical fibers may include some or all of several enhancements disclosed in U.S. Patent Application Publication No. 2016/0138958, the disclosure of which is incorporated by reference herein in its entirety. For the avoidance of doubt, the following summary of those enhancements will now be provided.

First, a reflective mirror cap may be attached to the bottom end of the side-emitting optical fiber to reflect light back through the side-emitting optical fiber and to prevent light from being lost out the bottom end. A similar reflective cap may be attached to the bottom end of the fluorescent optical fibers to reflect light back through the fluorescent optical fibers toward the attenuators.

Second, the side-emitting optical fiber may further comprise a curved reflective surface disposed between the side-emitting optical fiber and the surrounding jacket. Preferably the jacket is made of a material which is not optically transparent or translucent, such as metal or polymeric material. Similarly, the fluorescent optical fibers may further comprise a curved reflective surface disposed between the fluorescent optical fiber and a surrounding jacket. Preferably the jacket is made of a material which is not optically transparent or translucent, such as metal or polymeric material. In the case where the jacket is made of polymeric material, the jacket can be formed by molding. The side-emitting optical fiber may have a circular, square or hexagonal cross section, with the molded jacket conforming to the shape of the optical fiber.

Third, the side-emitting and fluorescent optical fibers may further comprise respective lenses formed (e.g., by molding) in the longitudinal slots of the respective jackets. Preferably the lenses extend the full length of the longitudinal slots. In combination, a lens and a jacket encase the side-emitting optical fiber, with the lens interfacing with the side window of the side-emitting optical fiber. Similarly, a lens and a jacket encase each fluorescent optical fiber, with the lens interfacing with the side window of fluorescent optical fiber. Preferably the lenses are made of epoxy.

The dual-FPOF fuel level sensors disclosed herein use no metallic components or electrical wiring in the fuel tank. Thus the fuel tank is insulated from electromagnetic interference and lighting effects. As a result of using optical sensors to measure fuel levels, the weight and cost of an airplane can be reduced.

A wing fuel tank system that uses electrical sensors can be retrofitted by substituting the optical sensors disclosed herein. Double shielded electrical wiring for the electrical sensors can be replaced with light and flexible plastic optical fiber, eliminating weight from the wiring and supporting brackets, and eliminating electromagnetic effects from lightning, shorting, fraying of electrical wiring.

While optical fuel level sensors have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

The embodiments disclosed above use one or more computing systems. As used in the claims, the term "computing system" comprises one or more of the following which communicate through a network or bus: a computer, a processor (e.g., the electronics processor 20 disclosed herein), a controller, a central processing unit, a microcontroller, a reduced instruction set computer processor, an ASIC, a programmable logic circuit, an FPGA, a digital signal processor, and/or any other circuit or processing device capable of executing the functions described herein. For example, a computing system may comprise multiple microcontrollers or multiple processors which communicate via interfaces.

The methods described herein may be encoded as executable instructions embodied in a non-transitory tangible computer-readable storage medium, including, without limitation, a storage device and/or a memory device. Such instructions, when executed by a processing or computing system, cause the system to perform at least a portion of the methods described herein.

The process claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the process claims be construed to exclude any portions of two or more steps being performed concurrently or alternatingly unless the claim language explicitly states a condition that precludes such an interpretation.

The invention claimed is:

1. An optical fiber assembly comprising:
   first, second and third holding rods;
   first, second and third glass tubes respectively partially embedded in and partially protruding from the first, second and third holding rods;
   a side-emitting optical fiber having a portion embedded in the first glass tube;
   a first fluorescent optical fiber having a portion embedded in the second glass tube;
   a second fluorescent optical fiber having a portion embedded in the third glass tube; and
   a supporting structure that supports the first, second and third holding rods in locations such that that light emitted by the side-emitting optical fiber will be received by the first and second fluorescent optical fibers.

2. The optical fiber assembly as recited in claim 1, wherein the side-emitting optical fiber and the first and second fluorescent optical fibers are made of plastic material.

3. The optical fiber assembly as recited in claim 1, wherein the embedded portions of the side-emitting optical fiber and the first and second fluorescent optical fibers are mutually parallel.

4. The optical fiber assembly as recited in claim 1, wherein the supporting structure comprises:
   an outer tube having first and second ends;
   a first end cap affixed to the first end of the outer tube; and
   a second end cap affixed to the second end of the outer tube,
   wherein the first, second and third holding rods are disposed inside the outer tube.

5. The optical fiber assembly as recited in claim 4, wherein the outer tube, first and second end caps, and first, second and third holding rods are made of composite material.

6. The optical fiber assembly as recited in claim 4, further comprising an optical fiber holding cylinder having first, second and third openings, wherein the first end cap has a recess which is configured to receive the optical fiber holding cylinder and also has first, second and third openings respectively aligned with the first, second and third openings in the optical fiber holding cylinder, the side-emitting plastic optical fiber passes through the first openings in the first end cap and optical fiber holding cylinder, the first fluorescent plastic optical fiber passes through the second openings in the first end cap and the optical fiber holding cylinder, and the second fluorescent plastic optical fiber passes through the third openings in the first end cap and the optical fiber holding cylinder.

7. The optical fiber assembly as recited in claim 6, wherein:
   the first end cap comprises a first portion integrally formed with a second portion;
   the first portion has a circular cylindrical outer surface with a first radius;
   the second portion has a circular cylindrical outer surface with a second radius less than the first radius;
   the recess is formed in the first portion of the first end cap; and
   the first, second and third openings of the first end cap being formed in the second portion of the first end cap.

8. The optical fiber assembly as recited in claim 7, wherein the second portion of the first end cap has first, second and third recesses, the first recess being configured to receive ends of the first composite holding rod and the first glass tube, the second recess being configured to receive ends of the second composite holding rod and the second glass tube, and the third recesses being configured to receive ends of the third composite holding rod and the third glass tube.

9. The optical fiber assembly as recited in claim 4, wherein the second end cap has first, second and third openings, the first opening being configured to receive ends of the first composite holding rod and the first glass tube, the second opening being configured to receive ends of the second composite holding rod and the second glass tube, and the third opening being configured to receive ends of the third composite holding rod and the third glass tube.

10. The optical fiber assembly as recited in claim 9, wherein the second end cap has at least one opening configured to allow liquid to flow into the outer tube when the optical fiber assembly is immersed in a reservoir containing liquid.

11. The optical fiber assembly as recited in claim 1, wherein a core of the first fluorescent optical fiber has a first fluorescing dopant, whereas a core of the second fluorescent optical fiber has a second fluorescing dopant different than the first fluorescing dopant.

12. The optical fiber assembly as recited in claim 1, wherein a core of the first fluorescent optical fiber has a first concentration of a fluorescing dopant, whereas a core of the second fluorescent optical fiber has a second concentration of the fluorescing dopant different than the first concentration.

13. A system for containing a liquid, the system comprising a reservoir and an optical fiber assembly installed in the reservoir, wherein the optical fiber assembly comprises:
   an outer tube having first and second ends;
   a first end cap having a portion seated inside the first end of the outer tube;
   a second end cap seated inside the second end of the outer tube;
   a side-emitting optical fiber extending from the second end cap to and through the first end cap;
   a first fluorescent optical fiber extending from the second end cap to and through the first end cap; and
   a second fluorescent optical fiber extending from the second end cap to and through the first end cap,
   wherein the first and second end caps support the side-emitting optical fiber and the first and second fluorescent optical fibers such that light emitted by the side-emitting optical fiber and not obstructed by intervening matter will be received by the first and second fluorescent optical fibers.

14. The system as recited in claim 13, wherein the optical fiber assembly further comprises:
   first, second and third holding rods supported at opposing ends by the first and second end caps; and
   first, second and third glass tubes respectively partially embedded in and partially protruding from the first, second and third holding rods, and
   further wherein the side-emitting optical fiber has a portion embedded in the first glass tube, the first fluorescent optical fiber has a portion embedded in the second glass tube, and the second fluorescent optical fiber has a portion embedded in the third glass tube.

15. The system as recited in claim 13, wherein a core of the first fluorescent optical fiber has a first photo response efficiency, and a core of the second fluorescent optical fiber has a second photo response efficiency different than the first photo response efficiency.

16. The system as recited in claim 13, wherein the second end cap has at least one opening configured to allow liquid to flow into the outer tube when the optical fiber assembly is in a reservoir containing liquid.

17. An aircraft comprising a fuel tank and an optical sensor disposed inside the fuel tank, wherein the optical sensor comprises:
   an outer tube having first and second ends;
   a first end cap having at least a portion seated inside the first end of the outer tube;
   a second end cap seated inside the second end of the outer tube;
   a side-emitting optical fiber extending from the second end cap to and through the first end cap;
   a first fluorescent optical fiber extending from the second end cap to and through the first end cap; and
   a second fluorescent optical fiber extending from the second end cap to and through the first end cap,
   wherein the first and second end caps support the side-emitting optical fiber and the first and second fluorescent optical fibers such that light emitted by the side-emitting optical fiber and not obstructed by intervening matter will be received by the first and second fluorescent optical fibers.

18. The aircraft as recited in claim 17, wherein the optical sensor further comprises:
   first, second and third holding rods supported at opposing ends by the first and second end caps; and
   first, second and third glass tubes respectively partially embedded in and partially protruding from the first, second and third holding rods, and
   wherein the side-emitting optical fiber has a portion embedded in the first glass tube, the first fluorescent optical fiber has a portion embedded in the second glass tube, and the second fluorescent optical fiber has a portion embedded in the third glass tube.

19. The aircraft as recited in claim 17, wherein a core of the first fluorescent optical fiber has a first photo response efficiency, and a core of the second fluorescent optical fiber has a second photo response efficiency different than the first photo response efficiency.

20. The aircraft as recited in claim 17, wherein the second end cap has at least one opening configured to allow fuel contained by the fuel tank to flow into the outer tube.

* * * * *